United States Patent [19]
Itoyama

[11] Patent Number: 6,019,094
[45] Date of Patent: Feb. 1, 2000

[54] ENGINE EXHAUST RECIRCULATION DEVICE

[75] Inventor: Hiroyuki Itoyama, Yokohama, Japan

[73] Assignee: Nissan Motor Co., Ltd., Yokohama, Japan

[21] Appl. No.: 09/010,186

[22] Filed: Jan. 21, 1998

[30] Foreign Application Priority Data

Jan. 21, 1997 [JP] Japan ................................. 9-008393

[51] Int. Cl.[7] ................................................. F02M 25/07
[52] U.S. Cl. ............................................ 123/676; 701/108
[58] Field of Search ........................ 123/568.21, 568.23, 123/568.25, 568.26, 568.27, 568.28, 676; 701/108

[56] References Cited

U.S. PATENT DOCUMENTS

| | | | |
|---|---|---|---|
| 4,433,666 | 2/1984 | Masaki et al. | 123/569 |
| 4,593,663 | 6/1986 | Atago et al. | 123/440 |
| 5,115,789 | 5/1992 | Aoyama | 123/569 |
| 5,359,975 | 11/1994 | Katashiba et al. | 123/435 |
| 5,551,408 | 9/1996 | Shimizu et al. | 123/571 |
| 5,724,950 | 3/1998 | Shino et al. | 123/676 |
| 5,778,674 | 7/1998 | Kimura | 60/600 |

FOREIGN PATENT DOCUMENTS

58-35255 3/1983 Japan.

*Primary Examiner*—Andrew M. Dolinar
*Assistant Examiner*—Mahmoud M. Gimie
*Attorney, Agent, or Firm*—Foley & Lardner

[57] ABSTRACT

In an engine exhaust recirculation device, a target exhaust recirculation rate is determined based on an engine running state. The required flowpath cross-sectional area of the exhaust recirculation passage to obtain a target exhaust recirculation rate is calculated from the target exhaust recirculation rate, fresh air amount, an intake pressure and an exhaust pressure. By determining a target opening of the exhaust recirculation valve from the required flowpath cross-sectional area of the exhaust recirculation passage and a predetermined coefficient specifying a relation between the required flowpath cross-sectional area and the opening area of the exhaust recirculation valve, the precision of controlling the exhaust recirculation amount is enhanced.

5 Claims, 12 Drawing Sheets

ENGINE EXHAUST RECIRCULATION DEVICE

The contents of Tokugan Hei 9-8393, with a filing date of Jan. 21, 1997 in Japan, are hereby incorporated by reference.

1. Field of the Invention

This invention relates to an exhaust recirculation device which in particular is applied to a diesel engine.

2. Background of the Invention

In an exhaust recirculation device (EGR device) which recirculates a part of the exhaust of a diesel engine into the intake air so as to lower the combustion temperature of the engine, an exhaust recirculation amount is controlled by the opening and closing of an EGR valve provided in an EGR passage connecting the exhaust passage and the intake passage of the engine as disclosed in U.S. Pat. No. 5,115,789.

Regarding control of the opening of the EGR valve, Tokkai Sho 58-35255 published by the Japanese Patent Office in 1983 sets a target EGR rate according to an engine rotation speed, fuel injection amount and engine load, and controls the opening of the EGR valve so as to achieve this target EGR rate.

However the flowrate characteristics of the EGR passage containing the EGR valve are different from the flowrate characteristics of the EGR valve itself, so by specifying a relation between the target EGR rate based on the flowrate characteristics of the EGR valve and the opening of the EGR valve itself, precise control of the EGR rate or EGR flowrate is not possible.

SUMMARY OF THE INVENTION

It is therefore an object of this invention to increase the precision of control of the EGR flowrate by means of a simple construction.

In order to achieve the above object, this invention provides an exhaust recirculation device for use with such an engine that has an intake passage, an exhaust passage and a combustion chamber. The device comprises an exhaust recirculation passage for recirculating a part of exhaust discharged from the combustion chamber into the intake passage, an exhaust recirculation valve provided in the exhaust recirculation passage, a sensor for detecting a fresh air amount aspirated into the engine through the intake passage, a sensor for detecting an intake pressure of the engine, a sensor for detecting an exhaust pressure of the engine, and a microprocessor.

The microprocessor is programmed to determine a target exhaust recirculation rate based on an engine running state, calculate a required flowpath cross-sectional area of the exhaust recirculation passage from the target exhaust recirculation rate, fresh air amount, intake pressure and exhaust pressure, calculate a coefficient specifying a relation between the required flowpath cross-sectional area and the opening area of the exhaust recirculation valve, determine a target opening area of the exhaust recirculation valve from the required flowpath cross-sectional area and the coefficient, and control the opening area of the exhaust recirculation valve to the target opening area.

It is preferable that the device further comprises a sensor for detecting an accelerator opening, and the microprocessor is further programmed to determine whether or not the engine is in a transient running state from a variation of the accelerator opening, calculate a target exhaust recirculation amount in the combustion chamber, calculate a target exhaust recirculation amount at a position of the exhaust recirculation valve by applying a predetermined advance correction to the target exhaust recirculation amount in the combustion chamber, and calculate the flowpath cross-sectional area based on the target exhaust recirculation amount at the exhaust recirculation valve position, when the engine is in a transient running state.

According to an aspect of the invention, the microprocessor is programmed to calculate the coefficient from a map specifying a relation between the coefficient and the required flowpath cross-sectional area.

According to another aspect of the invention, the microprocessor is programmed to calculate the coefficient according to the following relation:

$$Kaev = \sqrt{\frac{1}{1-\left(\frac{Aevs}{AVPS}\right)^2}}$$

where, Kaev=coefficient,
Aevs=required flowpath cross-sectional area,
AVPS=constant determined based on flowrate characteristics of the exhaust recirculation passage.

This invention also provides an exhaust recirculation device for use with such an engine that has an intake passage, exhaust passage and combustion chamber. The device comprises an exhaust recirculation passage for recirculating a part of exhaust discharged from the combustion chamber into the intake passage, an exhaust recirculation valve provided in the exhaust recirculation passage, a mechanism for detecting a fresh air amount aspirated into the engine through the intake passage, a mechanism for detecting an intake pressure of the engine, a mechanism for detecting an exhaust pressure of the engine, a mechanism for determining a target exhaust recirculation rate based on an engine running state, a mechanism for calculating a required flowpath cross-sectional area of the exhaust recirculation passage from the target exhaust recirculation rate, fresh air amount, intake pressure and exhaust pressure, a mechanism for calculating a coefficient specifying a relation between the required flowpath cross-sectional area and the opening area of the exhaust recirculation valve, a mechanism for determining a target opening area of the exhaust recirculation valve from the required flowpath cross-sectional area and the coefficient, and a mechanism for controlling the opening area of the exhaust recirculation valve to the target opening area.

The details as well as other features and advantages of this invention are set forth in the remainder of the specification and are shown in the accompanying drawings.

DESCRIPTION OF THE PREFERRED EMBODIMENTS

Figure 1:
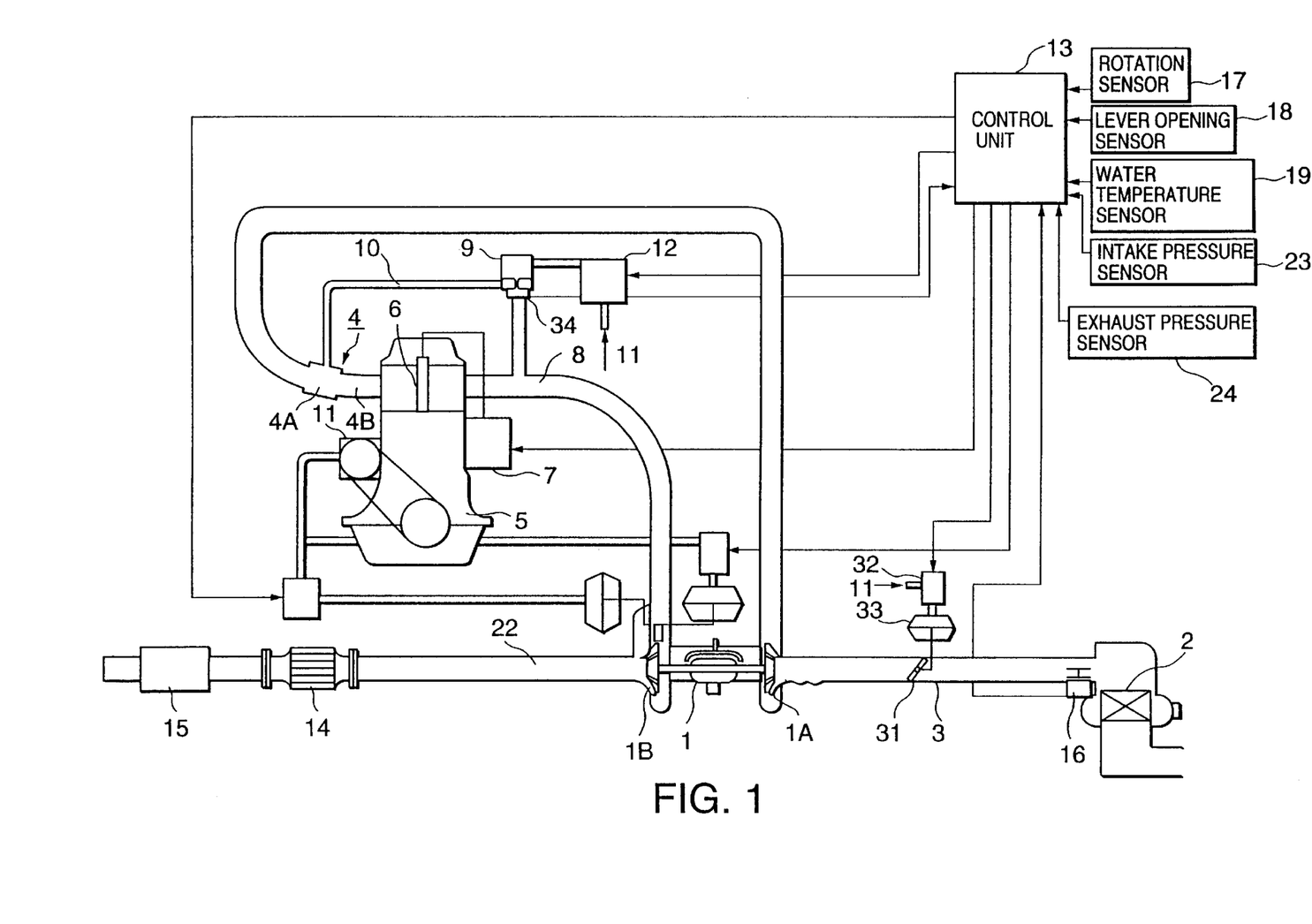
FIG. 1 is a schematic diagram of an exhaust recirculation controller according to this invention.

Referring to FIG. 1 of the drawings, an engine 5 aspirates air from which dust has been removed by an air filter 2 via an intake passage 3 and intake manifold 4. A fuel injector 6 is provided in each cylinder of the engine 5, the fuel injector 6 injecting fuel supplied under pressure from a fuel injection pump 7 into the air aspirated through the intake manifold 4 so as to form an air-fuel mixture. This air-fuel mixture is compressed by a piston of the engine 5, is ignited, and the engine 5 is rotated by the combustion energy.

Burnt gas in the engine 5 is discharged into the atmosphere via an exhaust manifold 8 and an exhaust passage 22. A filter 14 for trapping particulate matter and a muffler for silencing noise are provided midway along the exhaust passage 22. A turbine 1B of a turbocharger 1 which uses exhaust pressure to compress air is also provided in the exhaust passage 22.

An air flow meter 16 for detecting an intake air amount, a throttle 31 and a compressor 1A of the turbocharger 1 are provided in the intake passage 3. The compressor 1A, which is driven by the turbine 1B rotated by the exhaust pressure, pressurizes air in the intake passage 3 and supplies it to the engine 5.

The exhaust passage 22 and intake manifold 4 are connected by an EGR passage 10. An EGR valve 9 is provided in the EGR passage 10. A throttle 31 has the function of making the recirculation of exhaust easier by throttling the intake air during exhaust recirculation. The intake manifold 4 comprises a collector part 4A for temporarily accumulating intake air and a branch part 4B which distributes intake air to each cylinder of the engine 5, the EGR passage 10 being connected to the collector part 4A.

The EGR valve 9 is a negative pressure response valve, and its opening is controlled according to a dilution ratio by diluting a negative pressure of a vacuum pump 11 by atmospheric pressure using a solenoid valve 12. Likewise, the throttle 31 is controlled to an opening depending on the dilution ratio via a diaphragm 33 by diluting the negative pressure of the vacuum pump 11 by atmospheric pressure using a solenoid valve 32.

Alternatively, the EGR valve 9 may be driven by a step motor which rotates according to an input signal.

The openings of the EGR valve 9 and throttle 31, and the fuel injection timing and fuel injection amount of the fuel injector 6, are controlled by signals output by a control unit 13.

To perform these controls, detection signals are input to the control unit 13 from the aforesaid air flow meter 16, a lift sensor 34 for detecting a lift amount of the EGR valve 9, a rotation sensor 17 for detecting engine rotation speed, a lever opening sensor 18 for detecting a control lever opening of the fuel injection pump 7, a water temperature sensor 19 for detecting a cooling water temperature of the engine 5, an intake pressure sensor 23 for detecting an intake pressure and an exhaust pressure sensor 24 for detecting an exhaust pressure.

Based on these signals, the control unit 13 performs the aforementioned controls.

Next, the control of the opening of the EGR valve 9 and the process of calculating the fuel injection amount performed by the control unit 13, will be described referring to flowcharts.

Figure 2:
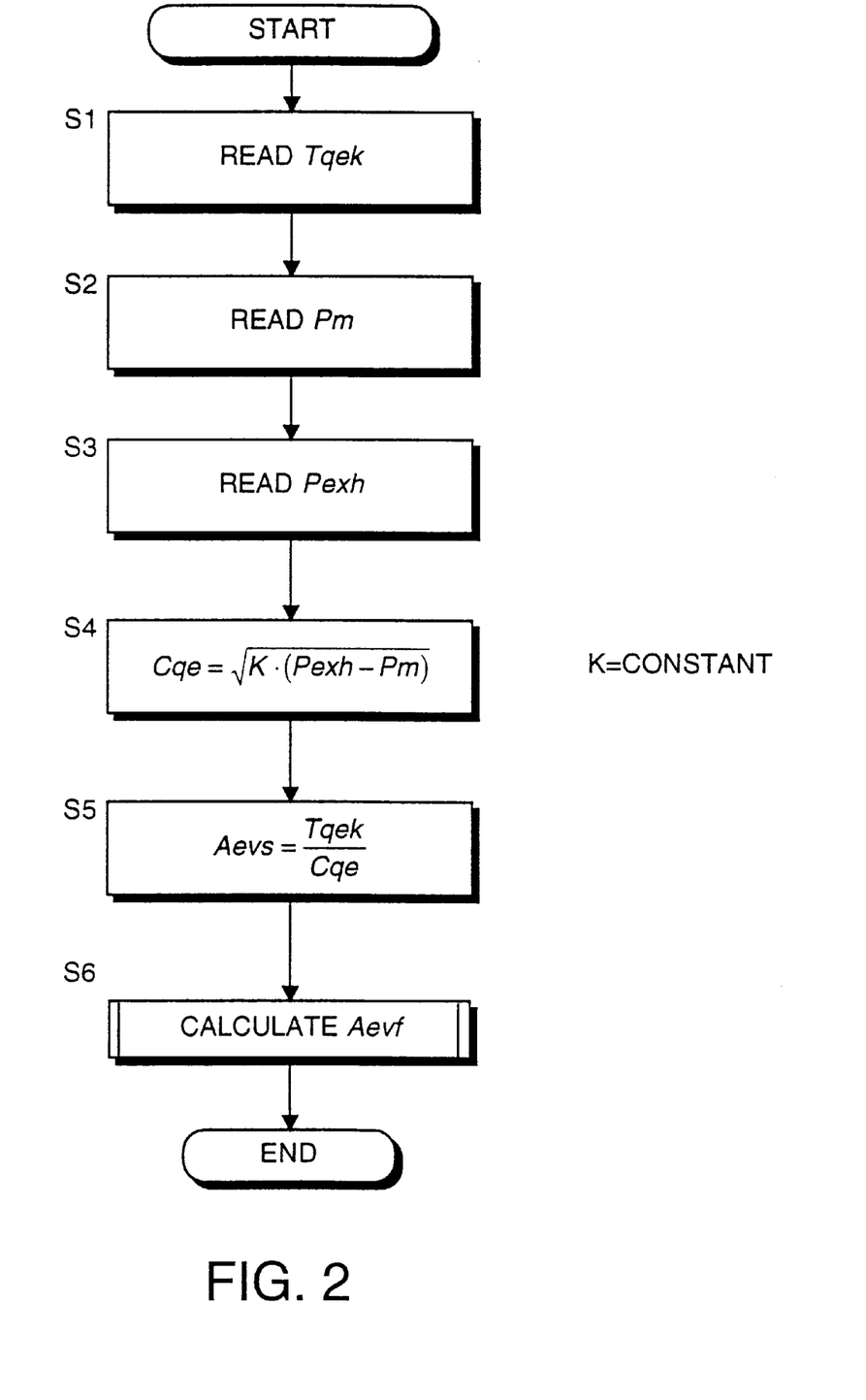
FIG. 2 is a flowchart describing a process of calculating an EGR valve opening area Aevf performed by the exhaust recirculation controller.

FIG. 2 of the drawings shows the process of calculating an EGR valve opening area Aevf performed by the control unit 13. This process is performed at a fixed interval. It should be noted that in this exhaust recirculation device, the opening of the EGR valve 9 is not fixed even during idle running of the engine.

First, in a step S1, the control unit 13 reads a target EGR flow rate Tqek for each cylinder. The Target EGR flow rate Tqek is calculated by a process shown in FIG. 3.

In a step S2, an intake pressure Pm of the engine 5 is read, and in a step S3, an exhaust pressure Pexh of the engine 5. In an exhaust recirculation device comprising an intake temperature sensor, the intake pressure Pm and exhaust pressure Pexh may be calculated also from the intake temperature.

In a step S4, an EGR flow velocity equivalent value Cqe is calculated from the intake pressure Pm and exhaust pressure Pexh by the following equation (1).

$$Cqe = \sqrt{K \cdot (Pexh - Pm)} \tag{1}$$

In a step S5, a flowpath cross-sectional area Aevs is calculated by dividing the target EGR flow rate Tqek by the EGR flow velocity equivalent value Cqe as in the following equation (2).

$$Aevs = \frac{Tqek}{Cqe} \tag{2}$$

Figure 11:
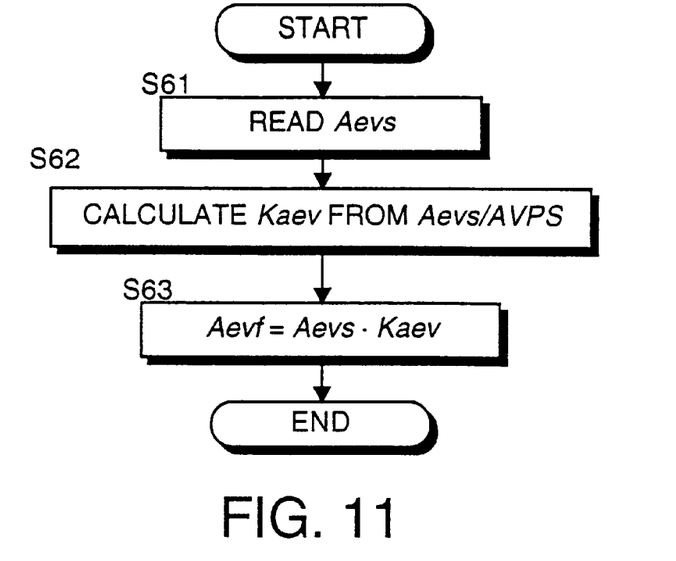
FIG. 11 is a flowchart describing a process for calculating an EGR valve opening area Aevf from a required EGR flowpath cross-sectional area Aevs performed by the exhaust recirculation controller.

An EGR valve opening area Aevf is calculated by a subroutine shown in FIG. 11 from the flowpath cross-sectional area Aevs in a step S6.

Next, the process of calculating the target EGR flow rate Tqek read in the step S1 is described. This calculation is performed in synchronism with the engine rotation by a process shown in FIG. 3.

Figure 3:
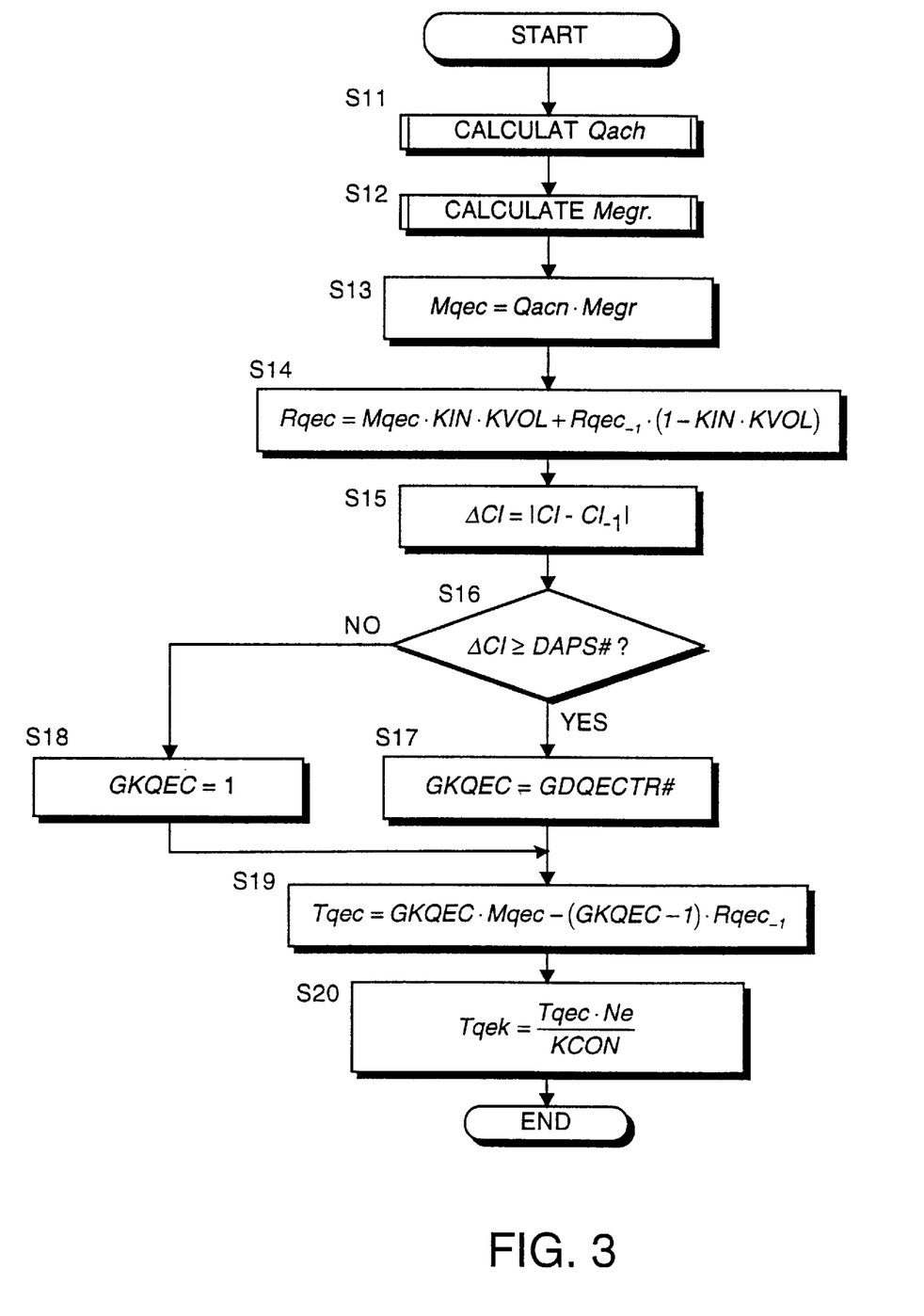
FIG. 3 is a flowchart describing a process of calculating a target EGR flow rate Tqek performed by the exhaust recirculation controller.
Figure 4:
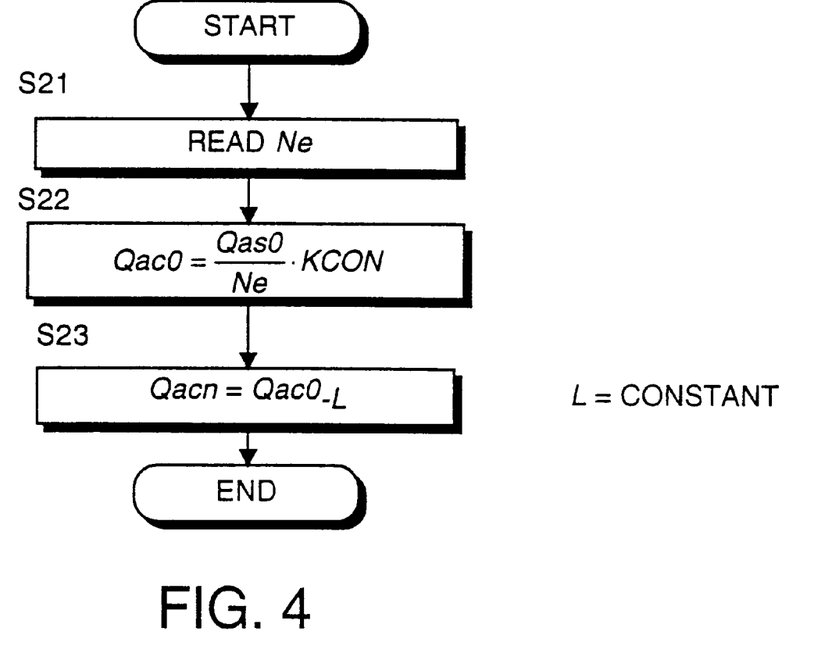
FIG. 4 is a flowchart describing a process of calculating a cylinder intake air amount Qacn performed by the exhaust recirculation controller.

First, an intake fresh air amount Qacn per one cylinder in the collector part 4A is calculated in a step S11. This is performed by a subroutine shown in FIG. 4. Referring to FIG. 4, an engine rotation speed Ne (rpm) based on an output signal of a rotation sensor 17 is read in a step S21, and a fresh air amount Qac0 per one cylinder is calculated by the next expression (3) in a step S22.

$$Qac0 = \frac{Qas0}{Ne} \cdot KCON \qquad (3)$$

where, Qas0=fresh air flow rate (kg/second),
KCON=constant for converting the flowrate to an into amount per one cylinder.

In a four cylinder engine, two cylinders aspirate air in one engine rotation, so KCON is 30. In a 6 cylinder engine, three cylinders aspirate air in one engine rotation, so KCON is 20.

In a step S22, a calculated value $Qac0_{-L}$ a plurality of occasions earlier is set equal to the intake fresh air amount Qacn taking account of the time required for intake air to reach the collector part 4A from the air flow meter 16.

Figure 5:
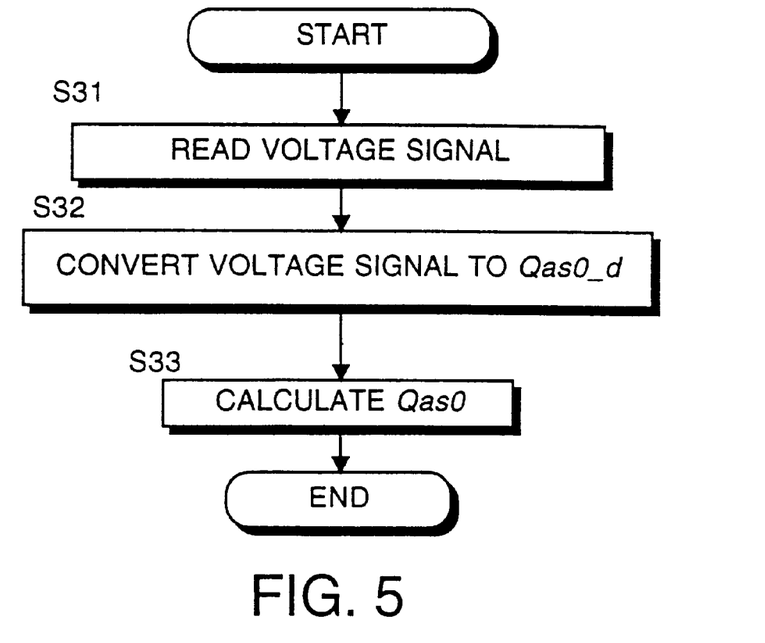
FIG. 5 is a flowchart describing a process of calculating an intake air amount Qas0 performed by the exhaust recirculation controller.
Figure 6:
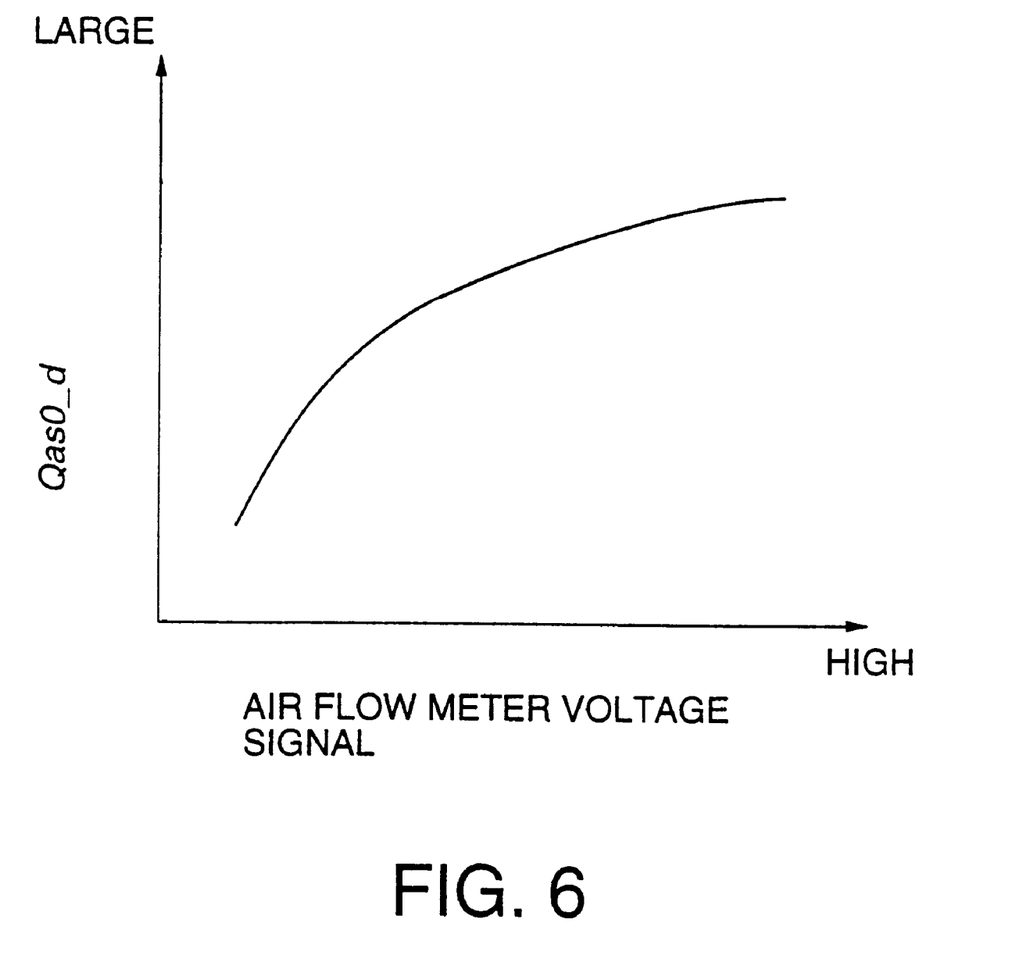
FIG. 6 is a diagram showing the contents of a map of intake air amount stored by the exhaust recirculation controller.

The fresh air amount Qac0 used in the step S22 is calculated at a fixed interval e.g. 4 milliseconds, by a process shown in FIG. 5 based on an output signal from the air flow meter 16. Describing this in more detail, a voltage signal output by the air flow meter 16 is read in a step S31. The voltage signal is converted into a flow rate Qas0_d using a map shown in FIG. 6 in a step S32. In a step S33, the fresh air amount Qac0 is calculated by applying weighted average processing to the flowrate Qas0_d After calculating the fresh air amount Qac0 in the collector part 4A in this way, the process proceeds to a step S12 in FIG. 3. Here, a target EGR rate Megr is calculated using a subroutine of FIG. 7.

Figure 7:
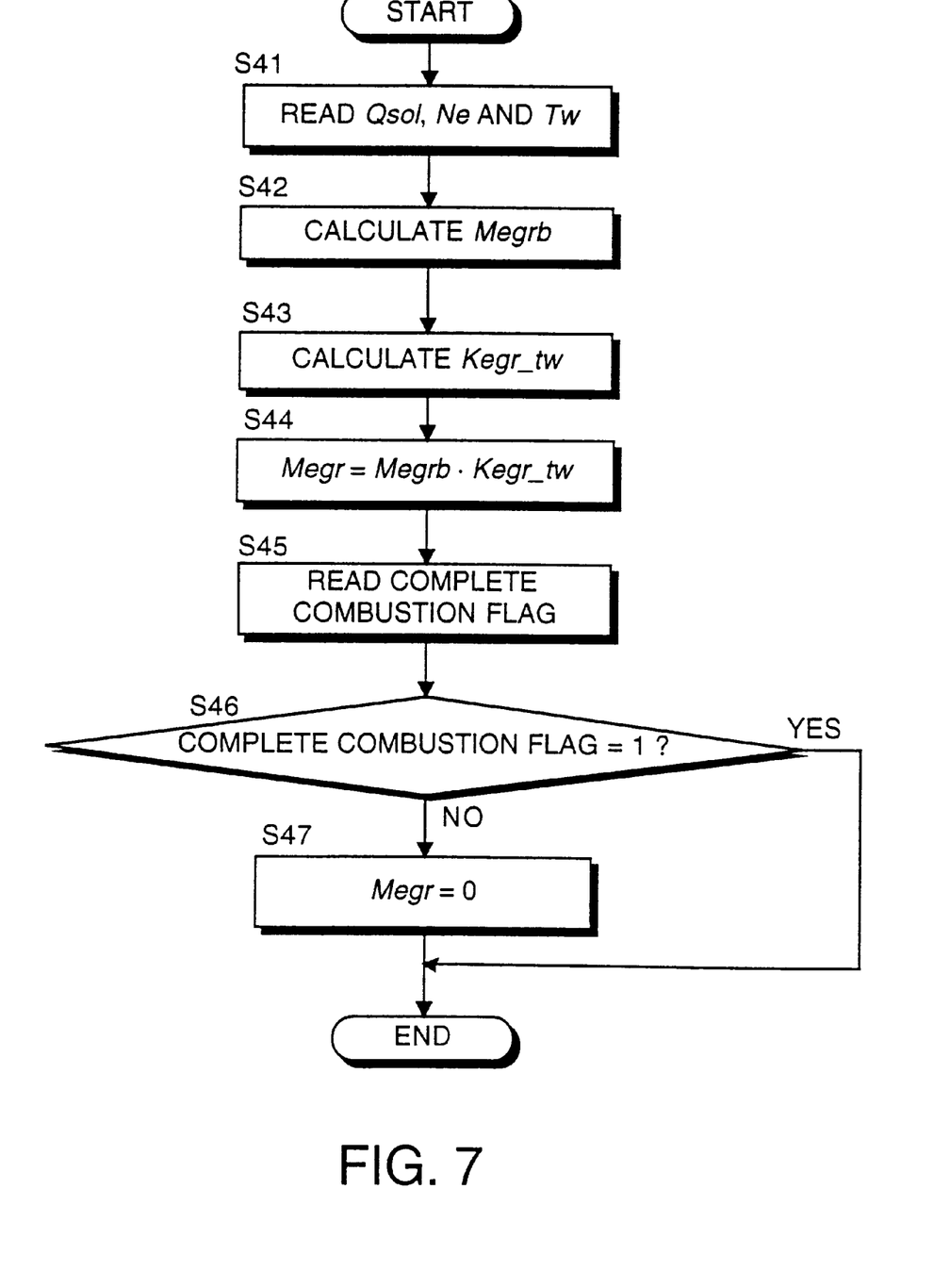
FIG. 7 is a flowchart describing a process of calculating a target EGR rate Megr performed by the exhaust recirculation controller.
Figure 8:
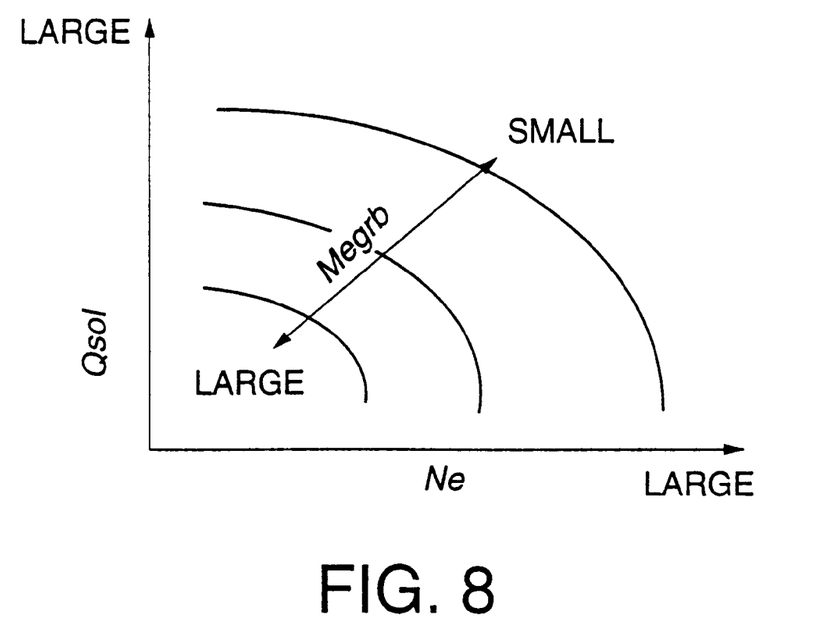
FIG. 8 is a diagram showing the contents of a map of a basic target EGR rate Megrb stored by the exhaust recirculation controller.

First, the engine rotation speed Ne, fuel injection amount Qsol and cooling water temperature Tw are read in a step S41. In a step S42, a map shown in FIG. 8 is looked up from the engine rotation Ne and fuel injection amount Qsol, and a basic target EGR rate Megrb is calculated.

Figure 9:
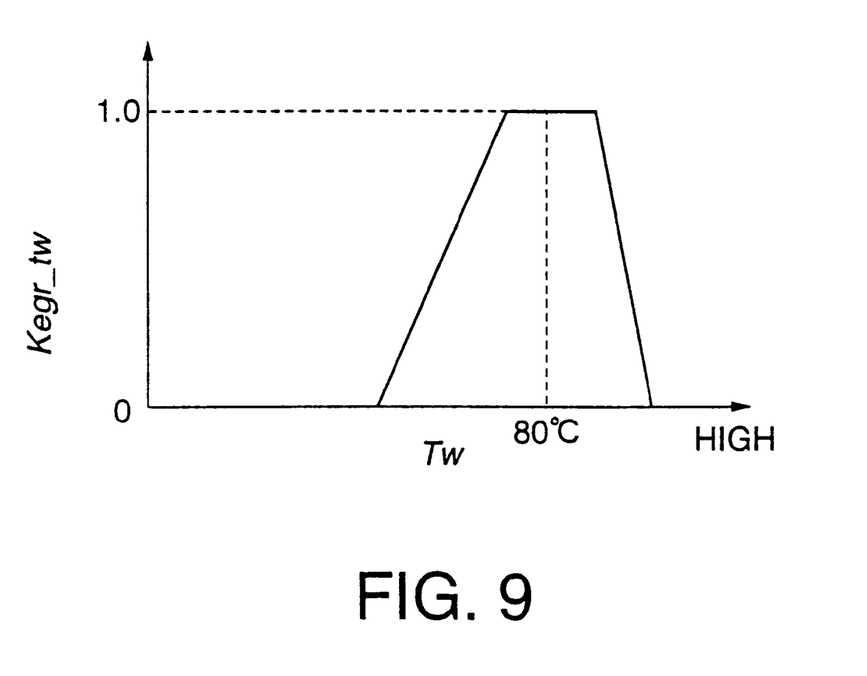
FIG. 9 is a diagram showing the contents of a map of an EGR rate compensation coefficient Kegr_tw stored by the exhaust recirculation controller.

In a step S43, a correction coefficient Kegr_tw depending on the engine cooling water temperature Tw is looked up from a map shown in FIG. 9.

In a step S44, a target EGR rate Megr is calculated by multiplying a basic target EGR rate Megrb by the correction coefficient Kegr_tw.

Complete combustion by the engine 5 is a condition of performing exhaust recirculation. Due to this, in a step S45, a complete combustion flag is read, and it is determined whether or not the complete combustion determining flag is "1" in a step S46. The complete combustion flag is set by a process shown in FIG. 10. When the complete combustion flag is not "1", the process simply terminates in a step S46. On the other hand when the complete combustion flag is "1", the target EGR rate Megr is reset to 0 and the process then terminates.

Figure 10:
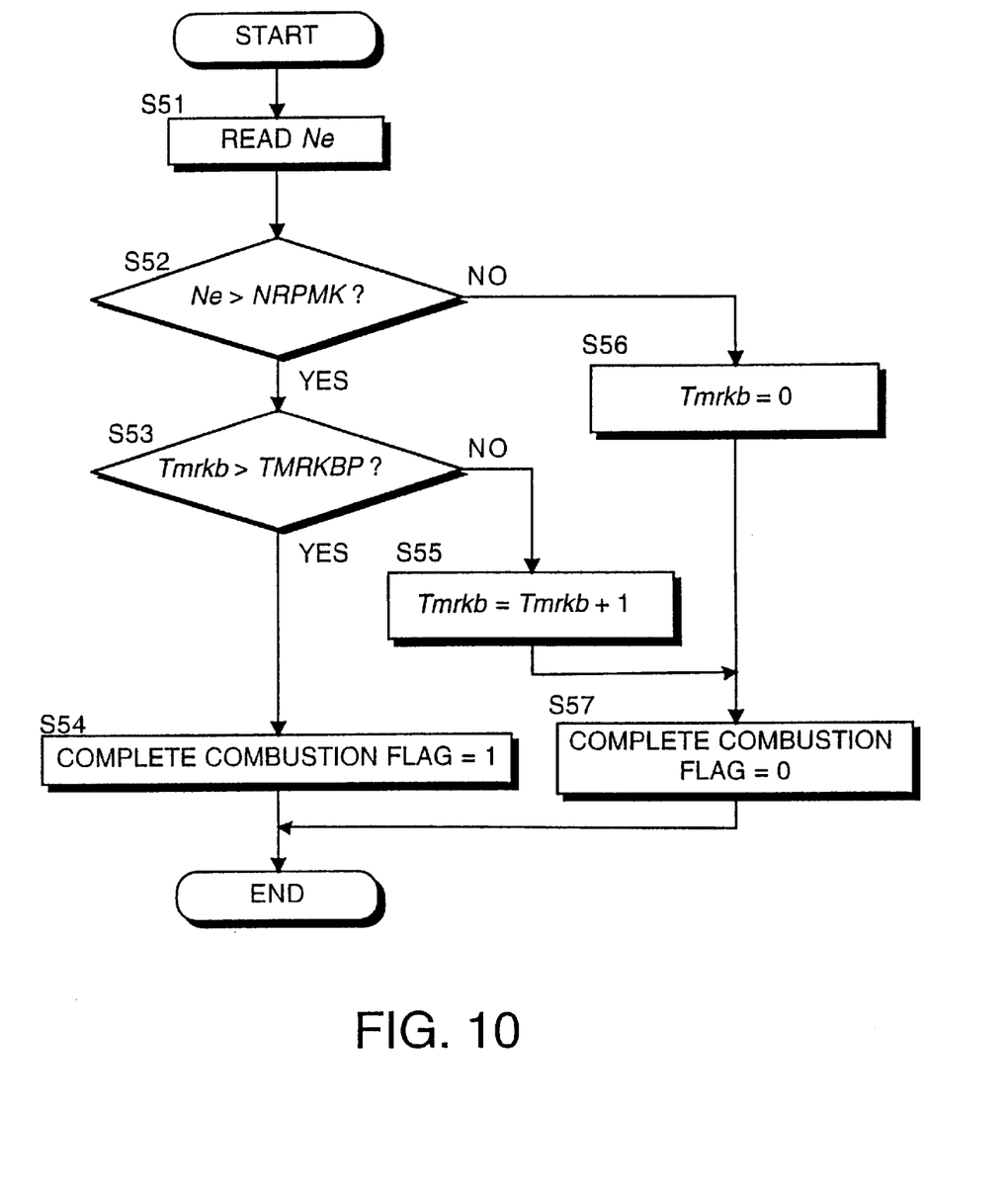
FIG. 10 is a flowchart describing a complete combustion determining process of the engine performed by the exhaust recirculation controller.

In the complete combustion determining process of FIG. 10, it is determined that complete combustion has taken place when the engine is driven at a rotation speed equal to or higher than a predetermined value in a predetermined time. Describing this process in more detail, the engine rotation speed Ne is read in a step S51. In a step S52, the engine rotation speed Ne is compared with a predetermined value NRPMK. The predetermined value NRPMK is set for example 400 rpm.

When Ne≦NRPMK, a counter value Tmrkb is reset to 0 in a step S56, the complete combustion flag is reset to 0 in a step S57, and the process is terminated.

When Ne>NRPMK, the counter value Tmrkb is compared with a predetermined value TMRBP in a step S53. When an initial value of the counter value Tmrkb is 0, therefore when Ne>NRPMK for the first time, Tmrkb<TMRBP. In this case, 1 is added to the counter value Tmrkb in a step S55, the complete combustion flag is reset to 0 in a step S57, and the process is terminated.

Hence when the condition Ne>NRPMK persists, eventually the counter value Tmrkb≧TMRBP. In this case, the complete combustion flag is set to 1 in a step S54.

By the above process, when the engine rotation speed exceeds the predetermined value NRPMK for a predetermined time TMRBP, the complete combustion flag is set to 1.

When the target EGR rate Megr is calculated as described hereabove, in the step S13 of FIG. 3, a target EGR amount Mqec per cylinder is calculated by the following expression (4) from the target EGR rate Megr and the intake fresh air amount Qacn per cylinder.

$$Mqec=Qacn \cdot Megr \qquad (4)$$

As the target EGR amount Mqec thus calculated is based on the fresh air amount Qacn in the collector part 4A, the target EGR amount Mqec is also a numerical value for the collector part 4A. In a step S14, a target EGR amount Rqec in the combustion chamber is calculated by applying a delay correction to the target EGR amount Mqec by the following expression (5) based on the distance between the collector part 4 and the combustion chamber in the cylinder where combustion of the air-fuel mixture is performed.

$$Rqec=Mqec \cdot KIN \cdot KVOL+Rqec_{-1} \cdot (1-KIN \cdot KVOL) \qquad (5)$$

where, Rqec−1=Rqec obtained on the immediately preceding occasion,
KIN=volumetric efficiency equivalent value= Kinn·Kinp,
Kinn=correction coefficient given according to the engine rotation speed Ne,
Kinp=correction coefficient given according to the intake air pressure Pm, $$KVOL = \frac{VE}{NC \cdot VM},$$

VE=exhaust volume of the engine,
NC=number of cylinders of the engine,
VM=volume of intake passage from collector part to combustion chamber.

In a step S15, an absolute value ΔCI of a difference between an accelerator opening CI and $CI_{-1}$ when the process was performed on the immediately preceding occasion, is calculated from the output signal of the lever opening sensor 18. ΔCI corresponds to a variation amount of the accelerator opening CI.

In a step S16, ΔCI is compared with a predetermined value DAPS#. When ΔCI is equal to or greater than the predetermined value DAPS#, it is determined that the engine 5 is in a transient running state, the routine proceeds to the step S17, and a correction gain GKQEC is set equal to a constant GKQECTR#. The constant GKQECTR# is any value except 1.

On the other hand when ΔCI is smaller than the predetermined value DAPS#, it is determined that the engine 5 is in a steady running state, the routine proceeds to a step S18, and the correction gain GKQEC is set to 1.

In a step S19, the Target EGR amount Tqec in the EGR valve position is calculated by applying an advance correction from the following equation (6) to the target EGR amount Rqec in the combustion chamber based on the distance from the EGR valve to the combustion chamber.

$$Tqec = GKQEC \cdot Mqec - (GKQEC - 1) \cdot Rqeo_{-1} \tag{6}$$

where, GKQEC=advance correction gain (constant).

When the engine 5 is in the steady running state, the correction gain GKQEC is 1 and Tqec=Mqec. In practice, therefore, neither the delay correction of the step S14 nor the delay correction of the step S19 is performed. It is in the transient running state that these corrections are performed.

In a step S20, the target EGR amount Tqec per cylinder is converted to the target EGR flow rate Tqek per second by the next expression (7), and the process is terminated.

$$Tqek = \frac{Tqec \cdot Ne}{KCON} \tag{7}$$

Next, referring to FIG. 11, the calculation of the EGR valve opening area Aevf performed in the step S6 of FIG. 2 will be described.

In a step S61, the flowpath cross-sectional area Aevs calculated in the step S5 of FIG. 2 is read.

Figure 12:
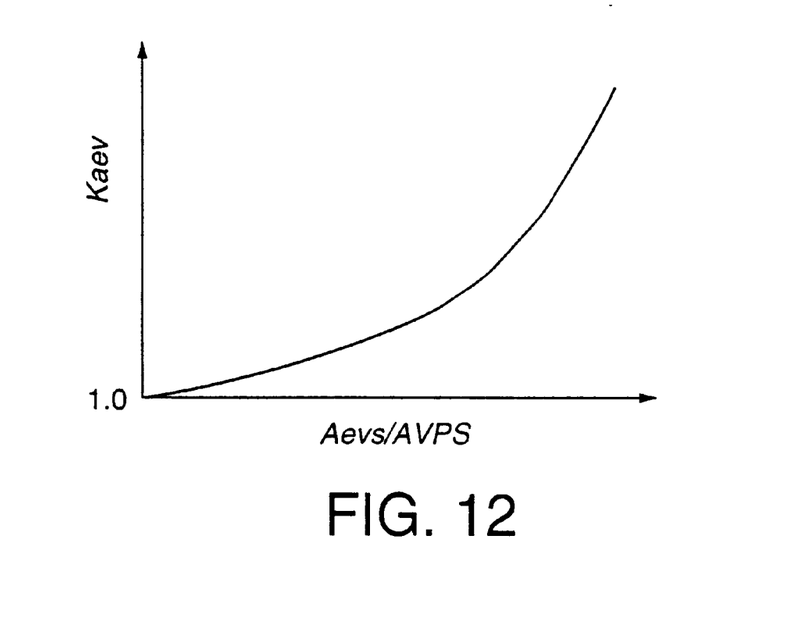
FIG. 12 is a diagram showing the contents of a map of a compensation coefficient Kaev stored by the exhaust recirculation controller.

In a step S62, the flowpath cross-sectional area Aevs is divided by the constant AVPS, and a map shown in FIG. 12 which is based on this value is looked up so as to calculate the correction coefficient Kaev.

Herein, the constant AVPS is a pipe diameter equivalent value of the EGR passage 10 which is first calculated based on fluid mechanical energy losses such as frictional losses in the EGR passage 10, losses due to curvature, and losses due to expansion or contraction of the flowpath. The constant AVPS may be set according to experimental observation.

In a step S63, the EGR valve opening area Aevf is calculated by multiplying the correction coefficient Kaev by the fowpath cross-sectional area Aevs.

Hence, by specifying the relation between the EGR valve opening area Aevf and the flowpath cross-sectional area Aevs by the correction coefficient Kaev which is a function of the constant AVPS based on the specification of the EGR passage, the EGR valve opening area Aevf required by the EGR flowpath cross-sectional area Aevs may be found easily and with high precision.

Figure 13:
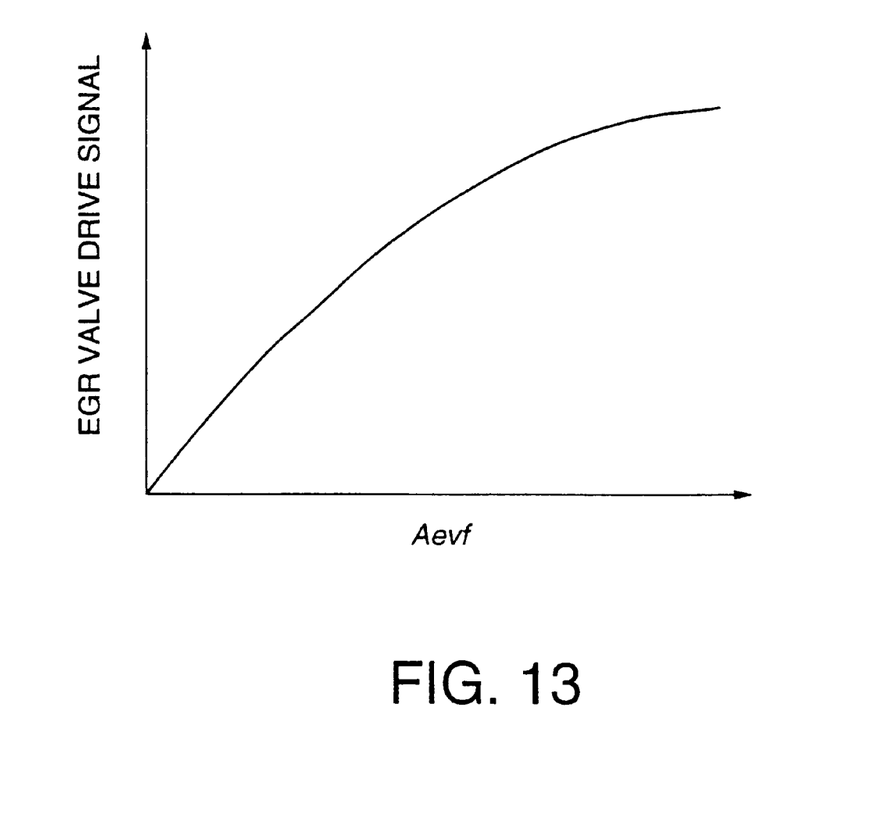
FIG. 13 is diagram showing the contents of a map of a command signal sent to the EGR valve.

When the EGR valve opening area Aevf is determined, the control unit 13 looks up a map shown in FIG. 13 from the value of Aevf, and determines an EGR valve drive signal. This EGR valve drive signal corresponds to for example the lift amount of the EGR valve and the number of steps of a step motor which opens and closes the EGR valve.

Figure 14:
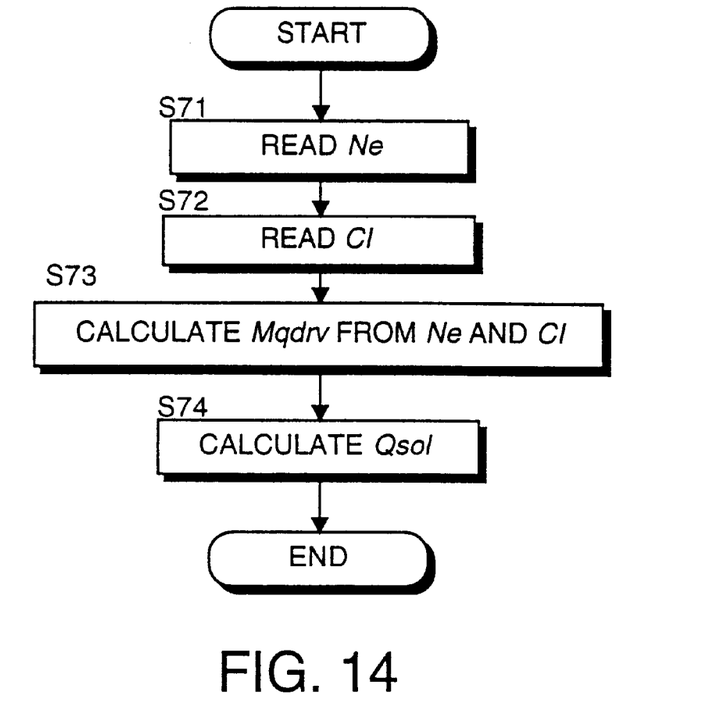
FIG. 14 is a flowchart for describing a process for calculating a fuel injection amount Qsol performed by the exhaust recirculation controller.

In this way, the control unit 13 controls the EGR amount, and also calculates the fuel injection amount according to the flowchart shown in FIG. 14. This process is performed in synchronism with the engine rotation.

Specifically, in a step S71, the engine rotation speed Ne is first read. In a step S72, the accelerator opening CI is read from the output signal of the lever opening sensor 18.

Figure 15:
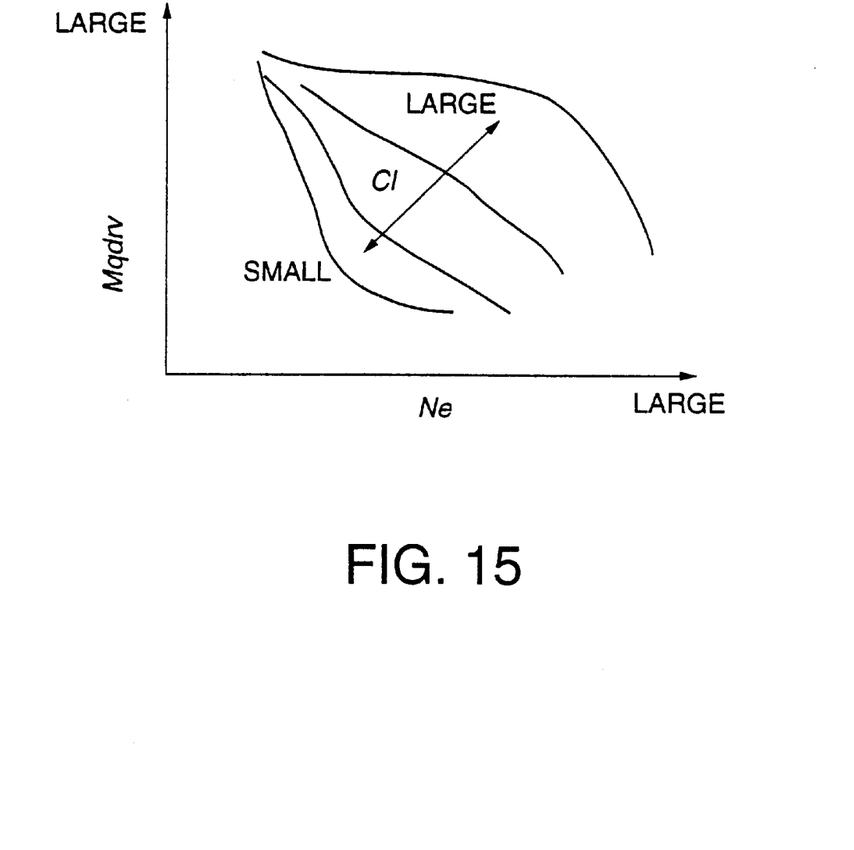
FIG. 15 is a diagram showing the contents of a map of a basic fuel injection amount Mqdrv stored by the exhaust recirculation controller.

In a step S73, a map shown in FIG. 15 is looked up from the engine rotation speed Ne and the accelerator opening CI, and a basic fuel injection amount Mqdrv is found.

In a step S74, a correction based on the cooling water temperature Tw and other corrections are applied to the basic fuel injection amount Mqdrv, and the fuel injection amount Qsol is calculated.

Figure 16:
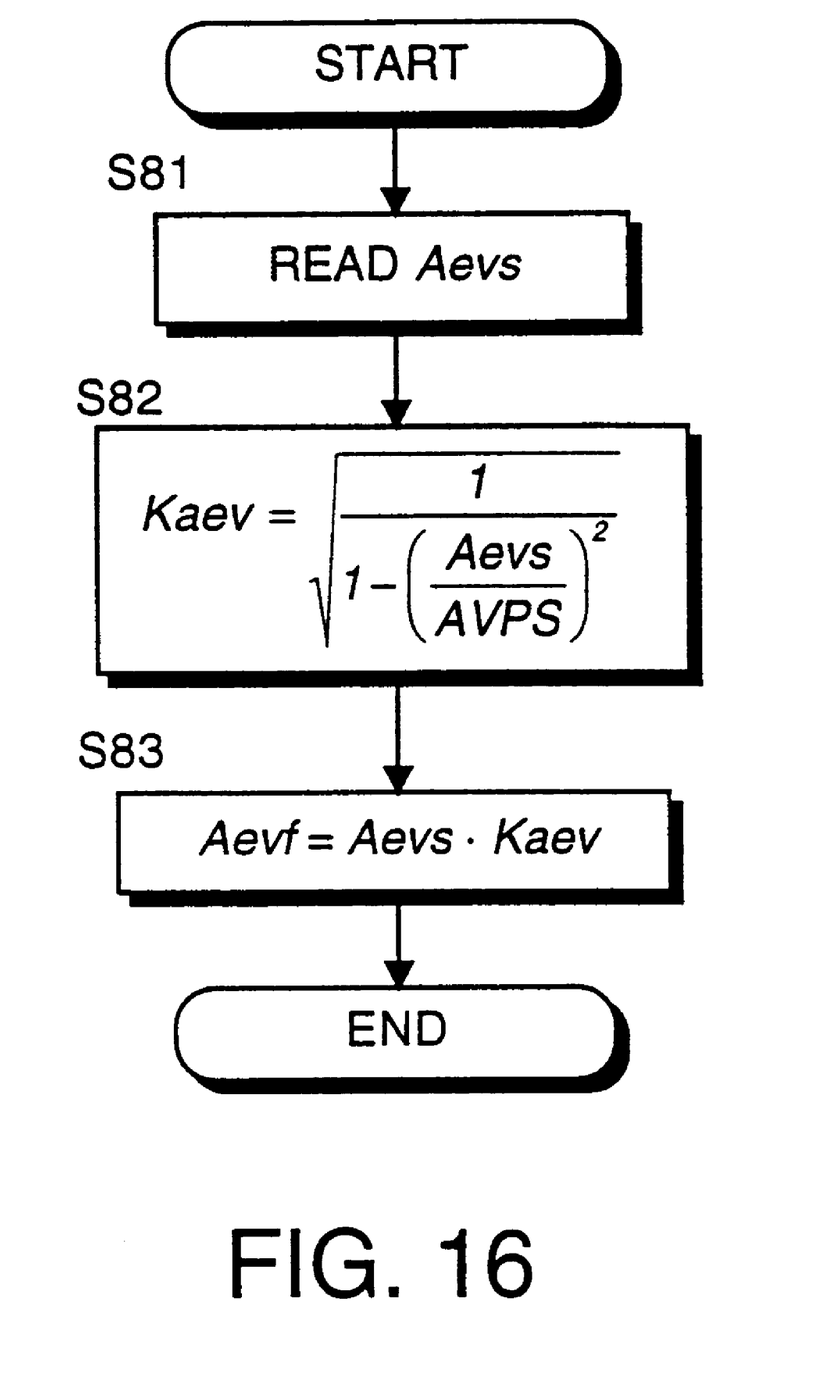
FIG. 16 is similar to FIG. 11, but showing a second embodiment of this invention.
Figure 17:
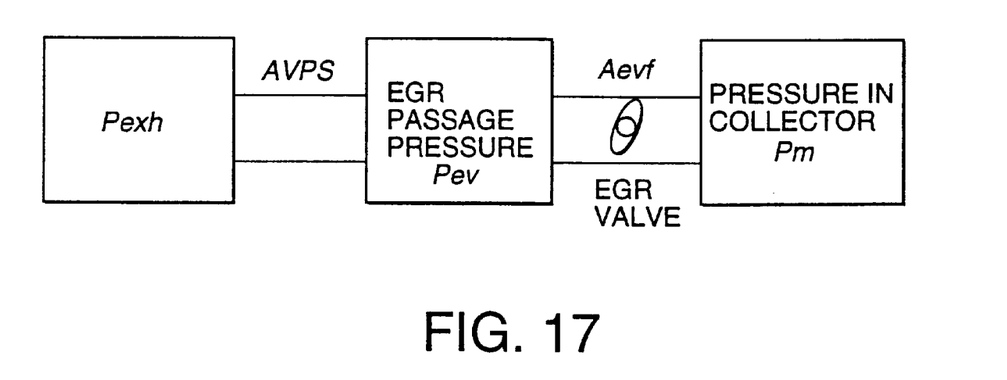
FIG. 17 is a diagram describing a pressure change in the EGR passage according to the second embodiment.

FIGS. 16 and 17 show a second embodiment of this invention.

This embodiment proposes an alternative method of calculating the EGR valve opening area Aevf of FIG. 11 of the aforesaid first embodiment, and comprises a step S82 instead of the step S62. The other steps are the same as those of the flowchart of FIG. 11.

In the step S82, the correction coefficient Kaev is calculated by the following expression (8) from the flowpath cross-sectional area Aevs and the constant AVPS.

$$Kaev = \sqrt{\frac{1}{1 - \left(\frac{Aevs}{AVPS}\right)^2}} \tag{8}$$

This expression is a theoretical equation derived from fluid mechanics based on the model shown in FIG. 17. In this way, the correction coefficient Kaev is found by calculation instead of from a map.

The corresponding structures, materials, acts, and equivalents of all means plus function elements in the claims are intended to include any structure, material, or acts for performing the functions in combination with other claimed elements as specifically claimed.

The embodiments of this invention in which an exclusive property or privilege is claimed are defined as follows:

1. An exhaust recirculation device for use with an engine comprising an intake passage, exhaust passage and combustion chamber, said device comprising:
    an exhaust recirculation passage for recirculating a part of exhaust discharged from said combustion chamber into said intake passage,
    an exhaust recirculation valve provided in said exhaust recirculation passage,
    a sensor for detecting a fresh air amount aspirated into said engine through said intake passage,
    a sensor for detecting an intake pressure of said engine,
    a sensor for detecting an exhaust pressure of said engine, and
    a microprocessor programmed to:
        determine a target exhaust recirculation rate based on an engine running state,
        calculate a required flowpath cross-sectional area of said exhaust recirculation passage from said target exhaust recirculation rate, fresh air amount, intake pressure and exhaust pressure,
        calculate a coefficient specifying a relation between said required flowpath cross-sectional area and the opening area of said exhaust recirculation valve,
        determine a target opening area of said exhaust recirculation valve from said required flowpath cross-sectional area and said coefficient, and
        control the opening area of said exhaust recirculation valve to said target opening area.

2. An exhaust recirculation device as defined in claim 1, wherein said device further comprises a sensor for detecting an accelerator opening, and wherein said microprocessor is further programmed to determine whether or not said engine is in a transient running state from a variation of said accelerator opening, calculate a target exhaust recirculation amount in said combustion chamber, calculate a target exhaust recirculation amount at a position of said exhaust recirculation valve by applying a predetermined advance correction to said target exhaust recirculation amount in said combustion chamber, and calculate said flowpath cross-sectional area based on said target exhaust recirculation amount at said exhaust recirculation valve position, when said engine is in a transient running state.

3. An exhaust recirculation device as defined in claim 1, wherein said microprocessor is programmed to calculate said coefficient from a map specifying a relation between said coefficient and said required flowpath cross-sectional area.

4. An exhaust recirculation device for use with an engine comprising an intake passage, exhaust passage and combustion chamber, said device comprising:

- an exhaust recirculation passage for recirculating a part of exhaust discharged from said combustion chamber into said intake passage,
- an exhaust recirculation valve provided in said exhaust recirculation passage,
- a sensor for detecting a fresh air amount aspirated into said engine through said intake passage,
- a sensor for detecting an intake pressure of said engine,
- a sensor for detecting an exhaust pressure of said engine, and
- a microprocessor programmed to:
    - determine a target exhaust recirculation rate based on an engine running state,
    - calculate a required flowpath cross-sectional area of said exhaust recirculation passage from said target exhaust recirculation rate, fresh air amount, intake pressure and exhaust pressure,
    - calculate a coefficient specifying a relation between said required flowpath cross-sectional area and the opening area of said exhaust recirculation valve,
    - determine a target opening area of said exhaust recirculation valve from said required flowpath cross-sectional area and said coefficient, and
    - control the opening area of said exhaust recirculation valve to said target opening area,
- wherein said microprocessor is programmed to calculate said coefficient according to the following relation:

$$Kaev = \sqrt{\frac{1}{1-\left(\frac{Aevs}{AVPS}\right)^2}}$$

where, Kaev=coefficient,
Aevs=required flowpath cross-sectional area,
AVPS=constant determined based on flowrate characteristics of said exhaust recirculation passage.

5. An exhaust recirculation device for use with an engine, said engine comprising an intake passage, exhaust passage and combustion chamber, comprising:

- an exhaust recirculation passage for recirculating a part of exhaust discharged from said combustion chamber into said intake passage,
- an exhaust recirculation valve provided in said exhaust recirculation passage,
- means for detecting a fresh air amount aspirated into said engine through said intake passage,
- means for detecting an intake pressure of said engine,
- means for detecting an exhaust pressure of said engine,
- means for determining a target exhaust recirculation rate based on an engine running state,
- means for calculating a required flowpath cross-sectional area of said exhaust recirculation passage from said target exhaust recirculation rate, fresh air amount, intake pressure and exhaust pressure,
- means for calculating a coefficient specifying a relation between said required flowpath cross-sectional area and the opening area of said exhaust recirculation valve,
- means for determining a target opening area of said exhaust recirculation valve from said required flowpath cross-sectional area and said coefficient, and
- means for controlling the opening area of said exhaust recirculation valve to said target opening area.

* * * * *